June 23, 1942.    J. H. S. SKONING    2,287,489
APPARATUS FOR PRODUCING INSULATING CONDUCTORS
Original Filed Feb. 14, 1939
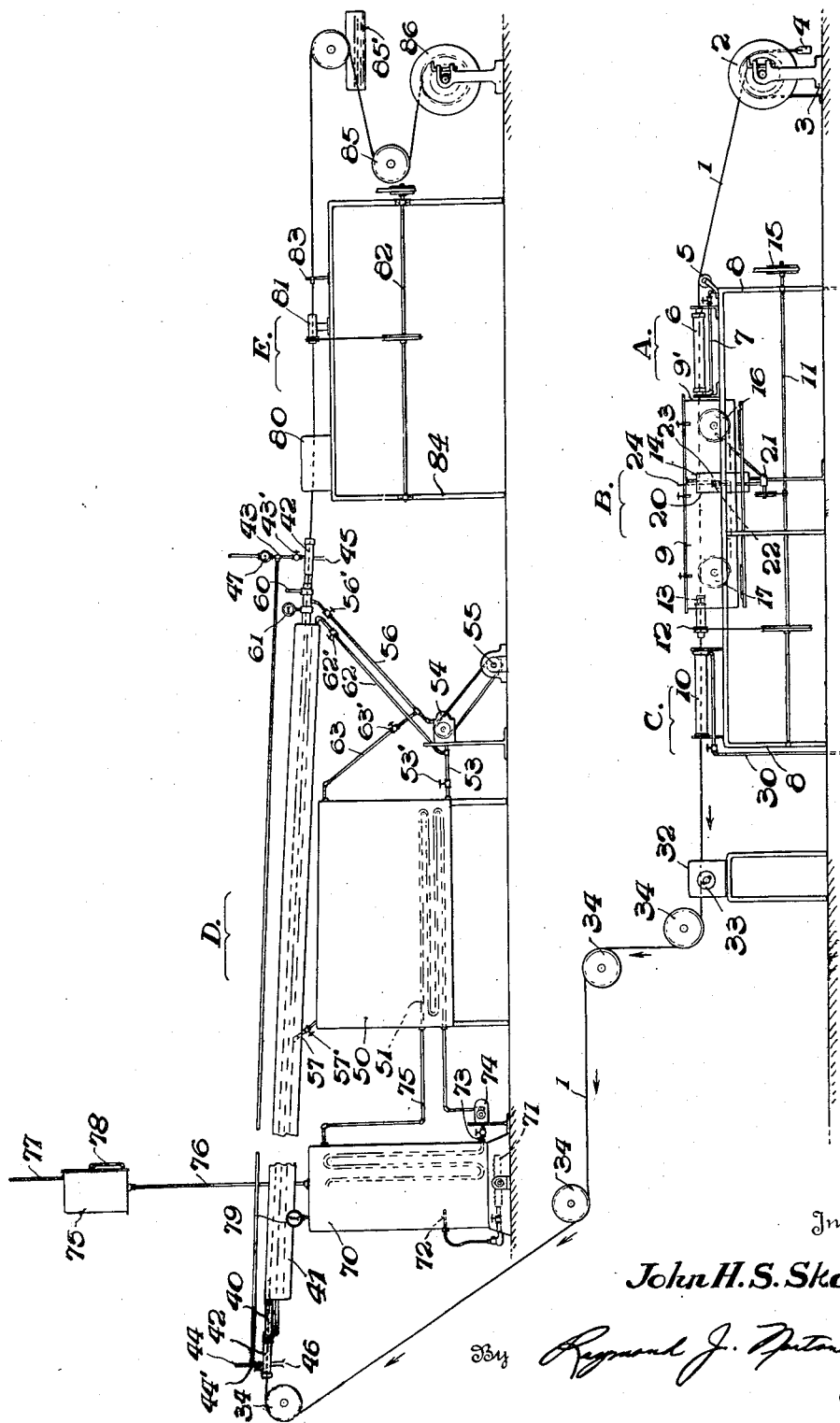
Inventor
John H. S. Skoning
By Raymond J. Horton
Attorney Patented June 23, 1942

2,287,489

UNITED STATES PATENT OFFICE 2,287,489

APPARATUS FOR PRODUCING INSULATING CONDUCTORS

John H. S. Skoning, Cranston, R. I.

Original application February 14, 1939, Serial No. 256,392. Divided and this application May 31, 1939, Serial No. 276,752

11 Claims. (Cl. 91—18)

This invention relates to an improved apparatus for continuously producing insulated conductors such as electrical cables and the like.

The present application is a division of copending application Serial No. 256,392, filed February 14, 1939.

As is disclosed in the earlier application referred to, it has been found that a wide variety of improved products may be produced by coating, impregnating or saturating a fibrous or similar matrix with a polymerizable resin and effecting a partial or complete polymerization by the application of polymerizing heat and dynamically balanced fluid pressure, which heat and pressure are directly applied by a single medium.

In the present invention this concept is invoked and is embodied in a process of continuously producing electrical conductors which are covered with a fibrous material impregnated with synthetic resins.

As is known, the insulating coverings of electrical conductors which are subjected to any degree of rigorous service are largely comprised of rubber or organic derivatives of good dielectric properties such as the halogenated condensed benzene compounds of the type of chlorinated napthalene. For many uses these insulators are not effective due, for example, to their relatively low heat resistance and the like. The synthetic resins provide insulating materials of great potential value, particularly for those uses for which rubber and chlorinated aromatic compounds are inherently unsuited. These resins, such for example as the phenol-methylene type are characterized not only by excellent electrical properties but also by improved physical and chemical properties. It has been found, as is more particularly explained in copending application Serial No. 256,392, that when properly formulated these resins may be utilized as an impregnant for the fibrous coverings of conductors to produce a product which satisfies the most rigorous specifications and which functions most efficiently in service use. As explained in that application, these resins may be employed to produce cables and conductors of relatively high flexibility by utilizing a sufficient amount of a suitable plasticizer, such as an aryl phosphate and incorporating this in the reaction mixture such as phenol and formaldehyde after the initial or condensation reaction (A stage) has initiated but before it is completed. The plasticized intermediate product thus produced may be coated upon or absorbed in the fibrous constituents of the conductor coating and then subjected to heat and pressure to convert it to a relatively insoluble and infusible modification (B or C stage) which is characterized by a marked flexibility.

Such improved products may be produced by a novel continuous method. In order to more clearly explain the new system of producing these products a flow sheet is shown in the accompanying drawing in which the elements of apparatus are illustrated diagrammatically.

Considered in its broader aspects the process contemplates the continuous passage of a fiber-coated wire product through an impregnating or saturating zone, in which the product is coated or impregnated with a potentially reactive synthetic resin, and thence through a pressure reaction zone in which sufficient heat and pressure are applied to convert the resin to a modified form, that is to say, a relatively infusible and insoluble yet flexible modification. As will be seen more fully during the continuous passage through the system the product is submitted to other operations to modify its physical characteristics.

The drawing discloses the preferred form of apparatus used for insulating electrical conductors or the like.

As is shown in the drawing the article to be treated passes successively through a drying stage A, a saturating stage B, a solvent removal stage C, a pressure conversion stage D and a finishing stage E.

In the drying stage A the moisture content of the fibrous constituents of the wrapping is reduced to an optimum low degree so as at the one time to facilitate wetting and impregnation by the potentially active resin (in stage B) and to substantially eliminate intumescence of the resin, due to entrained water in the polymerization stage D.

In stage B the predried or preconditioned covered wire is saturated by the potentially reactive resin, such as an A stage type of phenol-methylene resin of the character described in copending application Serial No. 256,392, hereinbefore referred to. Depending upon the type of product treated and the degree of resin impregnation desired, the length of travel through this saturating bath may be controlled so as to secure any desired retention period and thus to control the amount of resin taken up in the coating of the conductor.

For most operations it is desirable to utilize a solution of the A stage resin in a solvent and thus enable the use of saturants of relatively low viscosity and a commensurately high penetrability. It will be understood, however, that saturation may be secured by the A stage resin alone in the fluid form. For this purpose the saturating stage may include heating means to retain the resin in the liquid condition. However, as noted, for most purposes it is desirable to utilize the A stage resin in the form of a solution in a relatively volatile solvent. When the process is operated in this manner, after saturation, the saturated product is passed through a suitable chamber which forms the solvent removal stage C. In this stage, in a manner more particularly to be described, the volatile solvents are evolved or flashed off, leaving the A stage resin in a plastic state disseminated through the fibrous covering.

The product which moves continuously from the solvent recovery stage then comprises an electrical conductor having a fibrous covering of any desired type and which fibrous covering is coated, impregnated or saturated with a potentially reactive resin, that is to say one which may be converted to a more infusible and insoluble or resistant form by the application of heat and pressure. Under the concept of the invention this transformation of the impregnated resin to a more useful functional form is effected continuously. For this purpose the wire is passed through the polymerization stage D which consists essentially of a pressure-retaining vessel or autoclave in which heat and dynamically balanced fluid pressure are simultaneously applied to the product by means of an immersion liquor. Depending upon the type of wire treated, the particular type of resin utilized, and similar factors, the polymerization conditions such as the applied heat and pressure and the retention period are so controlled as to secure the desired degree of conversion of the resin.

After such conversion or polymerization in the autoclave, the product passes continuously through the finishing stage. In this stage, as will be understood the product may be treated in a fixing bath, dyed, polished or otherwise treated so as to put it in the desired final form.

With this type of treatment it will be appreciated that a high volume thru-put of conductors of markedly improved characteristics may be obtained with minimum installation costs and operating expenses. The system provides a simple method of effectively utilizing a synthetic resin in the production of insulating electric conductors.

With this concept of a continuous process in mind, embodying the major stages above defined, it will be appreciated that a wide permissive latitude for utilizing specific elements of apparatus is established. Commercial operations which have been conducted in the apparatus of the type shown in the flow sheet have been found to be effective, and for purposes of clarifying the essential features of the invention for those skilled in the art, such structure will be described. It will be understood, however, that this specific structure represents but one of many distinct forms of assemblages that is permissible within the scope of the invention.

In a preferred method of procedure the wire product 1 is unwound from the reel 2 and passed continuously through the system. The reel is mounted on the let-off stand 3 and the wire is fed off under a predetermined tension established and maintained by the let-off brake 4.

The wire passes from the reel 2 over the guide roller 5 to and through the drying stage A in which, as described, the moisture content of the fibrous constituents of the wire wrapping is reduced to a desirably low degree. This drying stage may be of any suitable type and may consist simply of an elongated tubular chamber 6 which is heated externally by means of the burner 7. While in the structure shown, the product 1 passes directly through the chamber, it will be understood that wherever desirable the retention period in this stage may be prolonged by passing it back and forth several times within the chamber prior to its transfer to the impregnating stage. This may readily be done, as will be understood, by mounting a series of guide rollers within the tube.

The drying unit 6 as shown, is mounted on the frame 8. This frame serves likewise to support the impregnating unit 9 and the solvent removal unit 10. The frame also serves to mount the driving means such as the shaft 11 which operates the polishing head 12 and sizing die 13 as well as the continuous hydrometer 14. These units may be driven from a single power source such as a motor (not shown) by suitable transmission means such as the belt and pulley 15.

The wire product undergoing treatment is passed continuously from the drying stage A to the impregnating stage B. This stage may comprise any suitable receptacle such as the tank 9, of suitable capacity. The wire enters the tank through the gland 9' and passes over the rolls 16 and 17. These rolls may be made up with a series of parallel grooves for receiving the convolutions of the wire. The wire may be thus passed back and forth through the length of the tank any predetermined number of times and during this passage is immersed in a solution of the A stage resin in a suitable volatile solvent. During this period the solution impregnates the fibrous coating. Since the characteristics of the final product are dependent, in no inconsiderable degree, upon the extent and uniformity of impregnation in stage B, and since such impregnation is dependent, in part, on the density of the impregnant, means are provided to control the impregnating operation by the characteristics of the impregnant. For this purpose the continuous gravity control hydrometer 14 is employed. Since this structure comprises the subject matter of a separate application for Letters Patent it is here shown only diagrammatically.

This hydrometer comprises essentially a container 20. The impregnant is pumped continuously from the immersion tank 9 into the container by means of the pump 21 and is continuously returned to the tank through the open return line 22. The pump may be driven from shaft 11, as shown. In the body of solution thus maintained, a float element of hydrometer bulb 23 is immersed. To this bulb is connected a projecting rod 24 provided at its upper end with a suitable stylus or indicator which is associated with a suitably calibrated dial. The rod is also provided with a contact member which at a predetermined vertical position is adapted to close an electrical circuit. The hydrometer unit is provided with suitable baffles so as to minimize oscillation of the bulb due to the flow of solution therethrough. As will be appreciated, with this type of structure the gravity of the impregnating solution is continuously indicated and/or recorded and the unit is available as an automatic control. Thus when the gravity of the impregnating solution becomes too high or too low the contact member on rod 24 closes an electrical circuit. This circuit may be directly associated with the power supply for drawing the wire through the system and may be made operable to cut the power supply and stop the operation when the gravity is either more or less than the optimum desired. The circuit may also be associated, through suitable relays, with the valves of containers for supplying additional solvent or resin to the immersion tank to thus automatically maintain the impregnating solution at the desired gravity.

After treatment in the tank 9 the impregnated wire passes through solvent removal stage C. This, like stage A, may comprise a tubular member 10 through which the wire passes and is heated as for example by means of the external burner 30. During passage through this unit the temperature is controlled so as to evolve the solvent which was initially added to the stage A resin. The evolved solvent may, if desired, be recovered by withdrawing the solvent vapors and passing these through a condenser. The condensed recovered solvent may be reemployed in making up the resin impregnant. As a result of the treatment in this stage the resin is transformed from a relatively fluid to a highly viscous material incorporated within the fibrous constituents of the insulating wrapping or coating.

From the drying stage C the wire passes to the coating box 32. This may be fitted with the pulley 33 on which the wire is convoluted. The box 32 may contain any coating material which is desired to be applied to the surface of the impregnated insulation such as finely divided mica, tacky resins and the like. The box may be provided with agitating mechanism (not shown) to insure uniform distribution of the coating material over the surface of the wire product undergoing treatment.

The product at this stage of the operation comprises a wire which is covered with a fibrous covering uniformly impregnated with a potentially reactive resin which may be converted into a product of excellent physical and electrical characteristics. The operations carried out in the stages A, B and C may therefore be considered a preconditioning treatment.

After such preconditioning the product is subjected to the final treatment which, as noted, comprises essentially the conversion of the impregnated matrix to a different and improved physical condition. In the improved mode of operation the product is passed continuously from the preconditioning stages to the final or conversion stage. It will be understood however, that whenever the exigencies of a particular operation or installation so require the preconditioned material may be wound up on reels and stored for subsequent treatment in the conversion stage of the process.

In the continuous process the preconditioned product passes from the coating box 32, over suitable guide rollers 34 to the continuous polymerization stage D. This comprises a suitable pressure retaining vessel such as the inclined, elongated tubular autoclave 40. Preferably, to reduce heat losses the autoclave is covered with the insulating jacket 41 composed of any suitable, effective insulating material. At each end the autoclave is fitted with the attached pressure sealing devices 42 of any suitable design. In the structure shown these comprise air locks, the air to which is supplied from a main air line through branches 43 and 44 controlled respectively by valves 43' and 44' and from which air is exhausted through lines 45 and 46. Interposed in line 43 is a control valve 47 which is operable to maintain a suitable constant pressure on the locks adapted to balance that maintained in the autoclave. As is known in this type of structure the air line connects with an air chamber fitted with glands for engaging the wire passing through, such that an effective pressure seal is established on the autoclave.

Associated with the autoclave is a storage vessel or accumulator 50 which is adapted to hold a quantity of heated immersion liquor and supply it to the autoclave under any predetermined pressure. The immersion liquor in accumulator 50 is maintained at a predetermined elevated temperature by means of the indirect heating coil 51 in a manner to be described.

As will be observed, the accumulator is connected in a fluid circuit with the autoclave. For this purpose the discharge line 53, having the control valve 53'; is connected with the intake side of pump 54 which is driven by any suitable power source such as motor 55. A discharge line 56 having an interposed valve 56' is connected at one end to the outlet of the pump and to the other end to the autoclave. The autoclave is also connected to the accumulator 50 through the return line 57 and valve 57'. With this arrangement, as will be understood, hot immersion liquor may be pumped continuously or intermittently from tank 50 through lines 53 and 56 into the autoclave, near the discharge end of the latter. The immersion liquor is returned to the accumulator through line 57 and control valve 57'. The autoclave is provided with temperature and pressure recording or indicating instruments 60 and 61 respectively which are located preferably at the immersion liquor inlet. The autoclave is also connected to the accumulator through a drainage circuit which includes line 62, having an interposed valve 62', connected to line 53 on the intake side of pump 54 and line 63, having a control valve 63', connected at one end to the discharge side of the pump and at the other end to an upper section of the accumulator. With this circuit, as will be observed, the autoclave may quickly be drained by continuing operation of the pump 54, closing valves 53', 56', and 57' and opening valves 62' and 63'.

With this type of circuit, it will be appreciated that immersion liquor may be maintained in the autoclave under any desired pressure and temperature and is adapted to transmit heat and pressure directly to the impregnated product passing through the autoclave. The temperature and pressure are individually or selectively adjustable to most effectively adapt these two factors to the particular type of resin and immersion liquor employed.

As was explained in application of John H. S. Skoning, Serial No. 78,419, filed May 7, 1936, for Method and apparatus for moulding and articles produced thereby the immersion liquor which is utilized is preferably one which is stable under the temperature conditions employed and one which does not react chemically with the material being treated. It has been found that stable hydrocarbons preferably the higher boiling, saturated hydrocarbons such as the paraffins serve effectively as the heat and pressure transmitting vehicle. Unsaturated or other relatively reactive compounds which tend to crack or decompose under the temperature conditions obtaining are desirable.

As indicated hereinbefore it is preferable to indirectly heat the immersion liquor so as to avoid cracking or decomposition. It is also desirable to use as the heating medium a liquid which has a boiling point not far above the desired maximum temperature which is to be maintained in the immersion liquor. Such heat transfer may effectively be secured by a heating system of the type shown in the drawing. This comprises a tank 70 which is heated by suitable means such as the burner 71. The burner is thermostatically controlled by means of the thermostatic element 72 which is in contact with the liquor to be heated, and which controls, for example, the flow of fuel to the burner.

In the preferred operation a suitable stable fluid such as triethylene glycol is employed as the heating medium. This liquid in heated condition is passed continuously or intermittently through the valve controlled outlet line 73 and pump 74 through the heat exchange coil 51 and thence through line 75 back to tank 70.

In order to insure a constant supply of heating medium in tank 70 as well as to take care of undue expansion of fluid therein an expansion tank 75 is positioned above heater 70 and is directly connected therewith through the pipe 76. The upper end of the expansion tank is provided with the vent 77 discharging to atmosphere or to a condenser. The expansion tank is preferably provided with a liquid level indicator 78 and the heater 70 with a thermometer 79 so that the quantity and temperature of the heating medium may constantly be checked.

With the described structure, it will be appreciated that with the proper setting of the thermostatic control on the heater 70, the immersion liquor in the accumulator may be maintained at any predetermined optimum degree and that this may be recycled at any desired pressure and velocity through the autoclave while in direct or immediate contact with the resin impregnated surface which is to be converted. In typical operations the product passes through the autoclave at a speed of the order of thirty feet per minute, more or less, depending upon the size and characteristics of the product being treated and is retained therein for a period of two or more minutes. As indicated, the temperature and pressure conditions within the autoclave are adjusted to secure the desired degree of polymerization or conversion; thus with typical fiber-covered wire products impregnated with phenolformaldehyde stage A resins, temperatures of the order of 300° F. and pressures of the order of from 15 to 30 lbs. more or less are utilized. The temperature, pressure and retention period within the autoclave, as will be appreciated are respectively correlated and adjusted to attain the degree of conversion of the resin which is desired in any particular case.

For certain uses it is desirable to produce an insulated conductor having a high flame resistance. In the present process this is readily secured by adding a flame inhibiting agent to the immersion liquor. Excellent results have been secured by adding an aryl phosphate, such as triphenyl or tricresyl phosphate to the immersion medium in the proportions of 25 to 30%, more or less of the inhibitor.

After treatment in the polymerization stage D the product passes to the final or finishing stage E. Such finishing may include a number of different treatments such as encasement in metal sheathing jackets, appearance braids and the like, depending upon the use to which the ultimate article is to be put. To illustrate the applicability of the process to all such finishing treatments a simple one is shown on the drawing. The finishing units may comprise a tank 80 containing a coating solution, dye solution or the like, such as a pigmented resin or cellulosic varnish. The product passing continuously through this unit is thus coated, dyed or the like. Thereafter the product may be passed through the polishing head indicated diagrammatically at 81. This unit may include polishing plates and dies and is suitably driven as for example from the drive shaft 82. The product then passes continuously through the wiper or doctor 83. The finishing units may be conveniently mounted on the frame 84 which also may serve to mount the shaft 82. After such treatment the product may be cooled as for example by passing through a cooling bath 85' and then over one or a series of pulleys 85 during which it is air cooled. Thereafter the finished product may be wound on this take-up reel 86, driven from any suitable power source.

It will be understood that the particular assemblage of units which has been described is given didactically to illustrate a physical embodiment of the process. Modification of this may be made without departing from the spirit of the invention. Thus in lieu of passing one end of the conductor continuously through the immersion stage and thence through the autoclave, the autoclave may be provided with air locks which are adapted to operate on two or more ends so that several conductors may simultaneously be treated in the one autoclave. These separate conductors may be passed simultaneously through a single impregnating tank or each conductor may be passed through its individual impregnating tank. In other words a battery of impregnating tanks, in which, if desired, differential impregnating conditions may be established, may be utilized with a single autoclave. Similarly while a tubular, inclined autoclave has been described it will be understood that other designs are available. Thus the autoclave may consist of a tank of any suitable design in the interior of which pulleys are mounted so that the conductor passes back and forth over the pulleys prior to removal from the autoclave. The number of passes may readily be adjusted to secure the desired retention period of the wire in the autoclave.

As already indicated the physical conditions which are established and maintained in the several stages are based upon the type of product which is desired. The speed of thru-put depends largely upon the size of the conductor. In typical operations conducted in an apparatus of the type disclosed herein number 18 conductors are passed through the system at an approximate speed of 1900 feet per hour. Conductors such as numbers 14, 12 and 8 are passed through at the approximate speed of 1500 feet per hour.

As illustrative of a typical operation a number 18 stove wire of markedly improved characteristics may be produced in the unit disclosed in the drawing. In such operations the wire passes through the unit at a speed of substantially 1825 feet per hour. In drying stage A the fiber-coated wire is subjected to a temperature of the order of 1000° F. for a period of from about 3 to about 5 seconds. In the impregnation stage B the coated wire is immersed in an A stage resin of the type described which is maintained at a temperature of approximately 120° F. for a period of about from 1 to 1¼ minutes. In the solvent removal stage C the impregnated conductor is subjected to a temperature of the order of 200° F. or higher depending on the solvent employed. In the autoclave, which in a typical installation is about 110 feet long, the conductor is contacted with a paraffin solution, of a melting point of about 140° F., containing from 25 to 35 per cent tricresyl phosphate which solution is maintained at a temperature of about 300° F. to 310° F. and at a pressure of from substantially 18 to 20 lbs. In these circumstances, the conductor is retained in the autoclave for a period of about 2¼ minutes.

The products producible by the new method are characterized by markedly improved properties. Conductors treated in the manner described present a striking heat resistance not enjoyed by other products such as the chlorinated naphthalene-impregnated conductors. For example, a conductor which is impregnated with chlorinated naphthalene when heated to a temperature of between about 180° F. to 200° F. will drip, due to the melting of the impregnant. When appearance braids are used to cover such conductors and the conductor is employed in heated environment there is a marked tendency for the halogenated material to bleed into the braid. The conductors described herein, on the other hand, show no dripping or bleeding in this temperature range. The new products also retain their electrical characteristics to a substantial degree even at very high temperatures. When the new products are heated over an open flame, at a temperature of the order of 2800° F. until all the combustibles are burned up, the conductors still possess a dielectric strength which is substantially 80 per cent of the original.

The improved products are likewise characterized by a high degree of chemical resistance in sharp contrast to products impregnated with relatively reactive halogenated compounds. Thus in the typical oxidation tests, employed in this field, the new products show substantially no oxidation losses.

An outstanding improved physical characteristic of the new material is a high flexibility. Thus conductors produced under the invention satisfy the most rigorous specification on this factor. For example, the new conductors after convolution for 14 turns on a ½ inch mandrel and immersion in tap water or saline solution at substantially 104° F. for three hours show no appreciable voltage leakage.

The new products, as already indicated, possess excellent electrical characteristics. The dielectric to breakdown of the new products, measured per mil of wall thickness, is from 25 per cent to 50 per cent higher than that of equivalent conductors treated with halogenated naphthalene. For example, a number 18 wire, with a 30 mil wall, which is produced according to the invention will run to 2,200 volts to breakdown. A similar product having a chlorinated naphthalene impregnant breaks down at from 1400 to 1500 volts.

It will thus be appreciated that the present invention not only provides an efficient apparatus for producing insulated conductors but also assures the production of improved products.

I claim:

1. An apparatus for producing insulated conductors comprising an elongated autoclave means to pass a fiber covered impregnated conductor continuously through the autoclave, a tank for containing an immersion liquor and means to circulate immersion liquor to and from the autoclave and tank under pressure.

2. An apparatus for producing insulated conductors which comprises in combination an elongated autoclave, means to pass a fiber covered impregnated conductor continuously through the autoclave, means to pump an immersion liquor to and through the autoclave under a predetermined elevated hydrostatic pressure.

3. An apparatus for producing insulated conductors which comprises, in combination, an elongated autoclave, means to pass a fiber covered impregnated conductor continuously through the autoclave, means to maintain a predetermined pressure in the autoclave during such passage and means to force an immersion liquor through the autoclave.

4. An apparatus for producing insulated conductors which comprises in combination means to continuously impregnate a fiber covered conductor with a solution of a synthetic resin, and means to subject the impregnated conductor to elevated temperature and pressure comprising an elongated tubular autoclave in which a body of heated immersion liquor is maintained.

5. An apparatus for producing insulated conductors which comprises in combination, an impregnating tank for containing a solution of a synthetic resin, an elongated autoclave, a tank for containing a heated immersion liquor, circuit connections between the autoclave and immersion liquor tank whereby the immersion liquor may be circulated to and from the autoclave and tank and means to pass a fiber coated conductor continuously through the impregnating tank and autoclave.

6. An apparatus for continuously producing synthetic resin-impregnated articles comprising, an impregnating tank for containing a solution of a synthetic resin, an autoclave, means to maintain a body of immersion liquor in the autoclave under predetermined pressure and temperature and means to pass continuously the article to be treated through the impregnating tank and autoclave.

7. In an apparatus of the class described, an elongated autoclave, a closed tank for containing an immersion liquor, means to circulate immersion liquor to and from the autoclave and tank under pressure and means to maintain the liquor in the tank at a predetermined elevated temperature.

8. In an apparatus of the class described, an elongated autoclave, a closed tank for containing an immersion liquor, means to circulate immersion liquor to and from the autoclave and tank under pressure, and means comprising an indirect heat exchange coil positioned within the tank to maintain the liquor in the tank at a predetermined elevated temperature.

9. In an apparatus of the class described, an autoclave, a closed tank for containing an immersion liquor, means to circulate liquor to and from the autoclave and tank under pressure, and means to maintain the liquor in the tank at a predetermined elevated temperature comprising a heater containing a heating liquid, a line, including a heat exchange coil positioned within the immersion liquor tank, and means to circulate the heating liquid from the tank through the said coil and back to the tank.

10. An apparatus for continuously producing fiber covered insulated conductors comprising means to continuously pass the conductor through a drying unit and thence to an impregnating tank wherein the conductor is impregnated with a solution of a synthetic resin in a volatile solvent, means to continuously pass the conductor through a second heating unit wherein the solvent is volatilized from the impregnated conductor, means to continuously pass the impregnated conductor through an autoclave wherein it is directly contacted for a predetermined period of time with a conditioning liquid maintained at a predetermined elevated temperature and pressure and means to continuously finish the conductor after withdrawal from the conditioning stage.

11. In an apparatus of the class described, an autoclave, through which a fiber covered insulated conductor is adapted to be continuously passed; an accumulator tank, a pipe connecting a lower portion of the tank with the autoclave, a pump in such line and a return line connecting the autoclave with the tank whereby liquor may be pumped from the tank to and through the autoclave.

JOHN H. S. SKONING.